Aug. 23, 1932.  G. W. DOYLE  1,872,910
CLUTCH
Filed Aug. 26, 1927
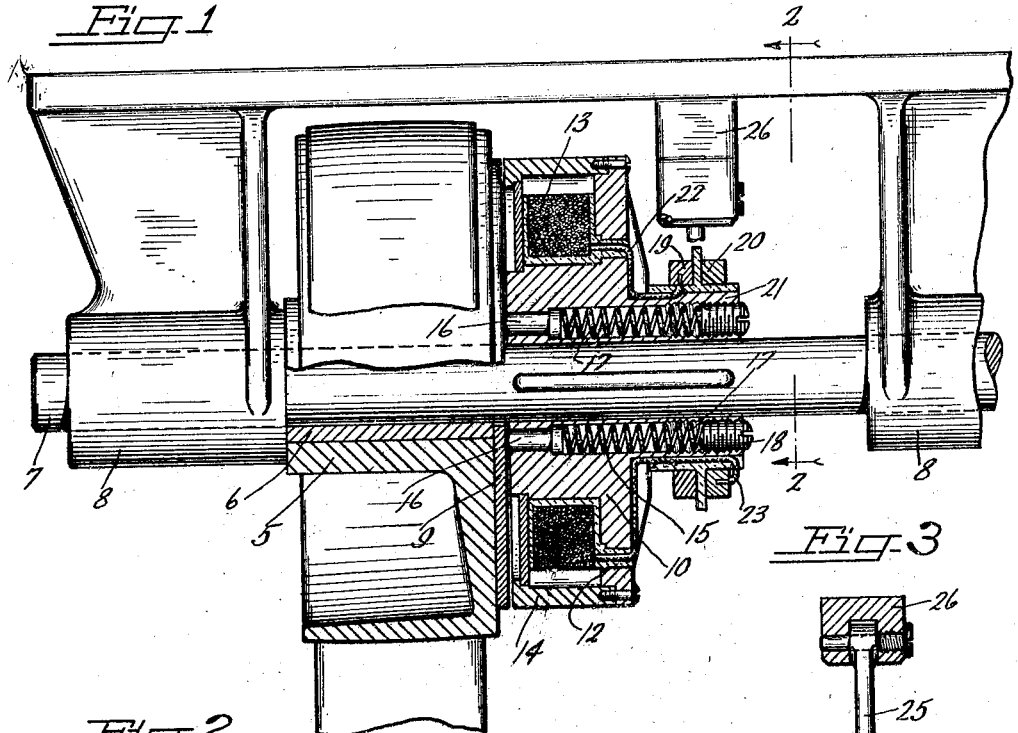
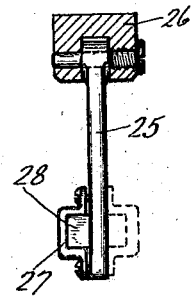
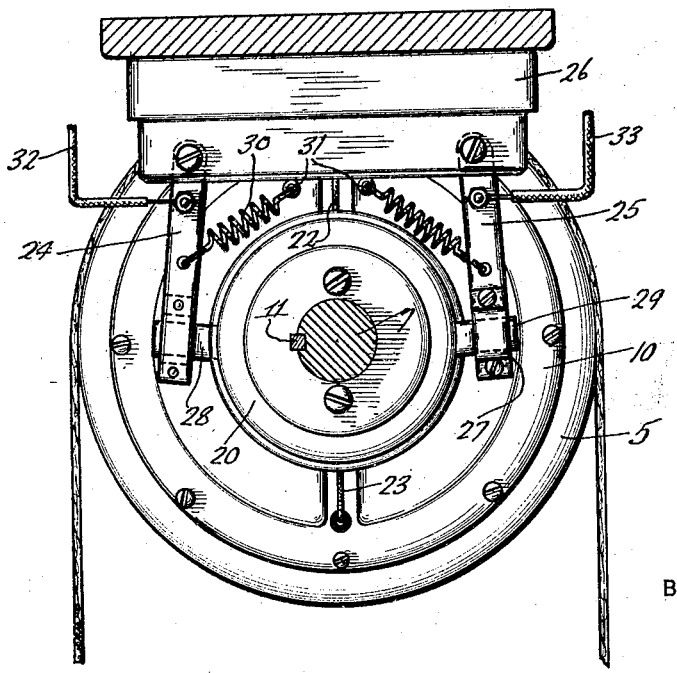
INVENTOR
George W. Doyle
BY Munday, Clarke &
Carpenter
ATTORNEYS Patented Aug. 23, 1932

1,872,910

UNITED STATES PATENT OFFICE

GEORGE W. DOYLE, OF ROME, NEW YORK, ASSIGNOR TO AMERICAN CAN COMPANY, OF NEW YORK, N. Y., A CORPORATION OF NEW JERSEY

CLUTCH

Application filed August 26, 1927. Serial No. 215,579.

This invention relates in general to a magnetic clutch, and has more particular reference to a disengaging means for preventing a continuance of the driving connection, due to residual magnetism in the clutch parts after the energizing current is cut off.

In connecting members for driving engagement by means of a magnetic clutch, it has been found that the necessary iron and steel parts do not immediately release when the electrical current is cut off, due to the residual magnetism in these parts, with the result that the driving connection is sometimes maintained longer than is necessary.

An important object of this invention, therefore, consists in the provision of operating parts unaffected by residual magnetism, actuated to release and disengage the magnetic parts as soon as the energizing current is turned off.

Numerous other objects and advantages of the invention will be apparent as it is better understood from the following description, which, taken in connection with the accompanying drawing, discloses a preferred embodiment thereof.

In the drawing:

Figure 1 is an elevation, with parts broken away and in section, of a clutch embodying the present invention;

Fig. 2 is a section taken on the line 2—2 of Fig. 1, showing an end view of the clutch; and Fig. 3 is a detail view of one of the brush holding arms.

Referring more particularly to the drawing, a pulley 5 is freely mounted by means of a sleeve 6 upon a drive shaft 7 supported in bearings 8. At one end of the pulley is a plate or armature member 9 of ferrous metal which is attracted by the clutch magnet.

A clutch member 10 is secured to the shaft 7 by means of a key 11 adjacent to the pulley 5 and with one face in close proximity to the plate 9. A recess 12 is provided in the member 10 for receiving a field coil 13 which, when energized, sets up a magnetic circuit through the body of the member 10 and outer rim 14 thereof and the adjacent plate 9 of the pulley 5, thus drawing the pulley and the member 10 with the plate 9 together in contact. In the fixed clutch member 10 adjacent the shaft 7 are a number of holes 15 threaded at one end and reduced at the other for receiving headed bearing pins 16 projecting from the face of the member 10 to engage the plate 9. Seated in each hole 15 is a coil spring 17 which is held in place by a screw 18 and tends to force the pin 16 to project from the face of the member 10. These pins 16 thus act as thrust pins for engaging the plate 9 to press it away from the clutch member 10 fixed on the shaft. These thrust pins 16 are made of non-ferrous metal, such as brass or copper, which are substantially incapable of residual magnetism and, therefore, as soon as current is cut off in the coil 13 the pins actuated by their springs 17 press the plate 9 with the pulley 5 and the fixed clutch member 10 out of engagement.

In order to supply current to the field coil 13, contact rings 19 and 20 are mounted upon but insulated from an extension 21 of the clutch member 10, having conductors 22 and 23 leading from the ends of the coil 13 to the separate contact rings. A pair of brush holders 24 and 25 are pivoted in a support 26 overlying the shaft 7, and each comprises a brush holding bracket 27 which may be secured to either side of the arm 24 or 25 for holding a brush 28 or 29 in engagement with its respective contact ring 19 or 20. Each contact arm is drawn in the direction of its contact ring by means of a spring 30 secured at one end to the arm and at the other end to an eye 31 on the support 26. Connected with the arms 24 and 25 are conductors 32 and 33 for supplying current to the field coil 13 as desired.

With this construction, it is obvious that whenever current is supplied to the field coil the clutch plate 9 of pulley 5 will be attracted and engaged with the clutch member 10 fixed to the shaft 7 for a driving connection, and as soon as current is cut off from the field coil 13, the non-magnetic thrust pins 16 operate to press the fixed clutch member and pulley apart by their engagement with the contact plate 9, thereby preventing a continuance of the driving connection between the parts due to residual magnetism, the thrust pins being unaffected thereby.

It is thought that this invention and many of its attendant advantages will be understood from the foregoing description, and it will be apparent that many changes may be made in the form, construction and arrangement of the parts without departing from the spirit and scope of the invention, or sacrificing all of its material advantages, the form hereinbefore described being merely a preferred embodiment thereof.

I claim:

1. In a clutch, relatively movable operating parts, an electromagnetic clutch mechanism to connect the parts together for driving movement, and non-magnetic means for forcing said parts entirely out of driving contact with each other, said clutch mechanism comprising a pulley, and a separate armature plate secured at the side of the pulley to rotate therewith.

2. In a clutch, a pulley and an electro magnet relatively movable, means for supplying current to the magnet to connect it for driving engagement with the pulley, and metallic non-ferrous means unaffected by residual magnetism to separate the parts and slidably engaging one of them when the current is cut off, said clutch comprising said pulley and a separate armature plate secured at the side of the pulley to rotate therewith.

3. In a clutch, a pulley, a magnetic clutch member and a shaft upon which they are both mounted, sliding spring pressed pins substantially incapable of residual magnetism, mounted in the body of the magnet element and bearing yieldingly against the armature, and means for supplying current to the clutch member to overcome the yielding bearing for driving the pulley and member together.

4. In a clutch, a pulley having an armature, a shaft upon which it is mounted, a magnetic clutch member secured to the shaft, and non-magnetic spring pressed bearing pins carried by one of the said members and yieldingly held in engagement with the other member.

5. In a clutch, a rotatable driving shaft, a driving pulley loosely mounted thereon carrying a magnetic plate on one side face thereof, a clutch member keyed to the shaft at the plate side of the pulley and constructed of ferrous metal, spring pressed bearing pins of non-ferrous metal carried by the member and projecting from the face thereof in contact with the plate carried by the pulley, and an electromagnetic winding mounted on the member having means for supplying an electric current thereto, to attract the plate for driving connection with the pulley and overcome the separating pressure of the bearing pins.

GEORGE W. DOYLE.